US007231741B2

(12) United States Patent
Norwood

(10) Patent No.: US 7,231,741 B2
(45) Date of Patent: Jun. 19, 2007

(54) MOBILE CELLULAR TELEPHONE TOWER

(75) Inventor: Rodney Earl Norwood, Pleasanton, CA (US)

(73) Assignee: SBC Technology Resources, Inc., Austin, TX (US)

(*) Notice: Subject to any disclaimer, the term of this patent is extended or adjusted under 35 U.S.C. 154(b) by 280 days.

(21) Appl. No.: 10/005,391

(22) Filed: Dec. 5, 2001

(65) Prior Publication Data

US 2002/0139064 A1 Oct. 3, 2002

Related U.S. Application Data

(60) Provisional application No. 60/280,578, filed on Mar. 30, 2001.

(51) Int. Cl.
*B66C 1/00* (2006.01)
*B60C 1/00* (2006.01)

(52) U.S. Cl. ............................ 52/118; 52/119; 52/110; 52/126.6; 52/79.1; 52/79.4; 52/79.5; 52/117; 343/713; 343/883; 343/901; 212/296; 212/231; 212/264

(58) Field of Classification Search .................. 52/110, 52/118, 126.6, 143, 79.1, 79.4, 79.5, 117; 343/713, 883, 901; 212/296, 231, 264
See application file for complete search history.

(56) References Cited

U.S. PATENT DOCUMENTS 2,857,994 A * 10/1958 Sheard .......................... 52/40
2,863,531 A * 12/1958 Campbell .................. 52/123.1
2,998,106 A * 8/1961 Aust ......................... 52/123.1
3,033,529 A * 5/1962 Pierrat ........................ 74/89.2
3,457,685 A * 7/1969 Stein ........................... 52/108
3,561,711 A * 2/1971 Dodge ..................... 248/163.1
3,606,713 A * 9/1971 Runquist ..................... 52/115
3,670,849 A * 6/1972 Milner, Jr. ................... 182/19
3,684,056 A * 8/1972 Penso .......................... 182/19
3,738,075 A * 6/1973 Nansel ........................ 52/115
3,931,698 A * 1/1976 Ebersold ...................... 52/118
4,185,288 A * 1/1980 Dosch et al. ............... 343/765
4,231,200 A * 11/1980 Henderson .................... 52/111
4,327,533 A * 5/1982 Sterner ........................ 52/115
4,393,630 A * 7/1983 Knox .......................... 52/121
4,420,917 A * 12/1983 Parlanti ..................... 52/123.1
4,442,919 A * 4/1984 Fulcher ..................... 182/63.1
4,589,520 A * 5/1986 Tapfer ....................... 182/69.4
4,866,893 A * 9/1989 McGinnis .................... 52/108
4,899,500 A * 2/1990 Miller et al. .................. 52/146
4,942,537 A * 7/1990 Verry ............................ 703/1
4,951,433 A * 8/1990 Miller et al. ............... 52/126.6
5,168,679 A * 12/1992 Featherstone ................ 52/118
5,168,680 A * 12/1992 Matlock ...................... 52/118
5,244,346 A * 9/1993 Fergusson ................... 416/142

(Continued)

*Primary Examiner*—Carl D. Friedman
*Assistant Examiner*—Christy M. Green
(74) *Attorney, Agent, or Firm*—Cardinal Law Group

(57) ABSTRACT

A mobile cellular telephone tower comprises a self-propelled base and a tower connected to the base. The tower includes a base segment and at least a first extendable segment operatively connected to a second extendable segment. A winch is connected to the base, and a first cable is connected between the base segment and the first extendable segment to extend the first extendable segment. A second cable is connected between the winch and the second extendable segment to retract the second extendable segment. Cellular telephone network testing equipment mounted on the tower.

19 Claims, 3 Drawing Sheets

U.S. PATENT DOCUMENTS

| | | | | |
|---|---|---|---|---|
| 5,247,776 | A * | 9/1993 | Tamayo | 52/745.17 |
| 5,307,898 | A * | 5/1994 | Purdy et al. | 182/69.4 |
| 5,333,422 | A * | 8/1994 | Warren et al. | 52/115 |
| 5,394,162 | A * | 2/1995 | Korovesis et al. | 343/703 |
| 5,524,398 | A * | 6/1996 | Miller et al. | 52/121 |
| 5,531,419 | A * | 7/1996 | Gustafsson et al. | 248/519 |
| 5,537,125 | A * | 7/1996 | Harrell et al. | 343/878 |
| 5,628,050 | A * | 5/1997 | McGraw et al. | 455/12.1 |
| 5,787,111 | A * | 7/1998 | Gilmore | 375/130 |
| 6,104,910 | A * | 8/2000 | Koths | 455/11.1 |
| 6,606,075 | B1 * | 8/2003 | Chun | 343/890 |

* cited by examiner

MOBILE CELLULAR TELEPHONE TOWER

RELATED APPLICATION

This application claims priority to U.S. patent application Ser. No. 60/280,578 filed on Mar. 30, 2001 entitled "MOBILE CELLULAR TELEPHONE TOWER" by Rodney E. Norwood, the entire disclosure of which is incorporated by reference, herein.

TECHNICAL FIELD OF THE INVENTION

This invention generally relates to cellular telephone networks, and more particularly to a mobile cellular telephone tower.

BACKGROUND OF THE INVENTION

Cellular telephones are increasingly popular. In general, a cellular telephone communicates with a stationary local tower, which in turn connects the call to a conventional telephone network. When it becomes necessary to expand cellular coverage to a new area, it is often desirable to test certain operations before erecting a permanent cellular tower. This pre-construction testing normally involves raising cellular transceiver equipment to heights of 80 feet or more.

One method of accomplishing this involves the use of a crane. The crane can be towed or driven to the test site, and used to hoist the testing equipment to the required height. In a similar method, a prefabricated trailer with an erectable antenna can be towed to the test site. U.S. Pat. No. 4,912,893, for example, shows a transportable cellular mobile radiotelephone site which includes an edifice that requires a portable crane to remove it from a truck on which it is delivered.

There are significant drawbacks to both of the conventional approaches. Often, the designated location is too small to accommodate a crane or trailer. In other instances, the designated site may not be accessible by road. In the case of unimproved locations, mud, steep grades or low laying foliage may make it difficult or impossible for a crane or trailer to negotiate.

SUMMARY OF THE INVENTION

The present invention is a mobile cellular telephone tower comprising a self-propelled base and a tower connected to the base. The tower includes a base segment and at least a first extendable segment operatively connected to a second extendable segment. A winch is connected to the base, and a first cable is connected between the base segment and the first extendable segment to extend the first extendable segment. A second cable is connected between the winch and the second extendable segment to retract the second extendable segment. Cellular telephone network testing equipment is mounted on the tower.

Accordingly, it is an object of the present invention to provide a mobile cellular telephone tower of the type described above that can be deployed in locations that are relatively inaccessible.

Another object of the present invention is to provide a mobile cellular telephone tower of the type described above in which the tower segments are powered into both the extension and retraction directions.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
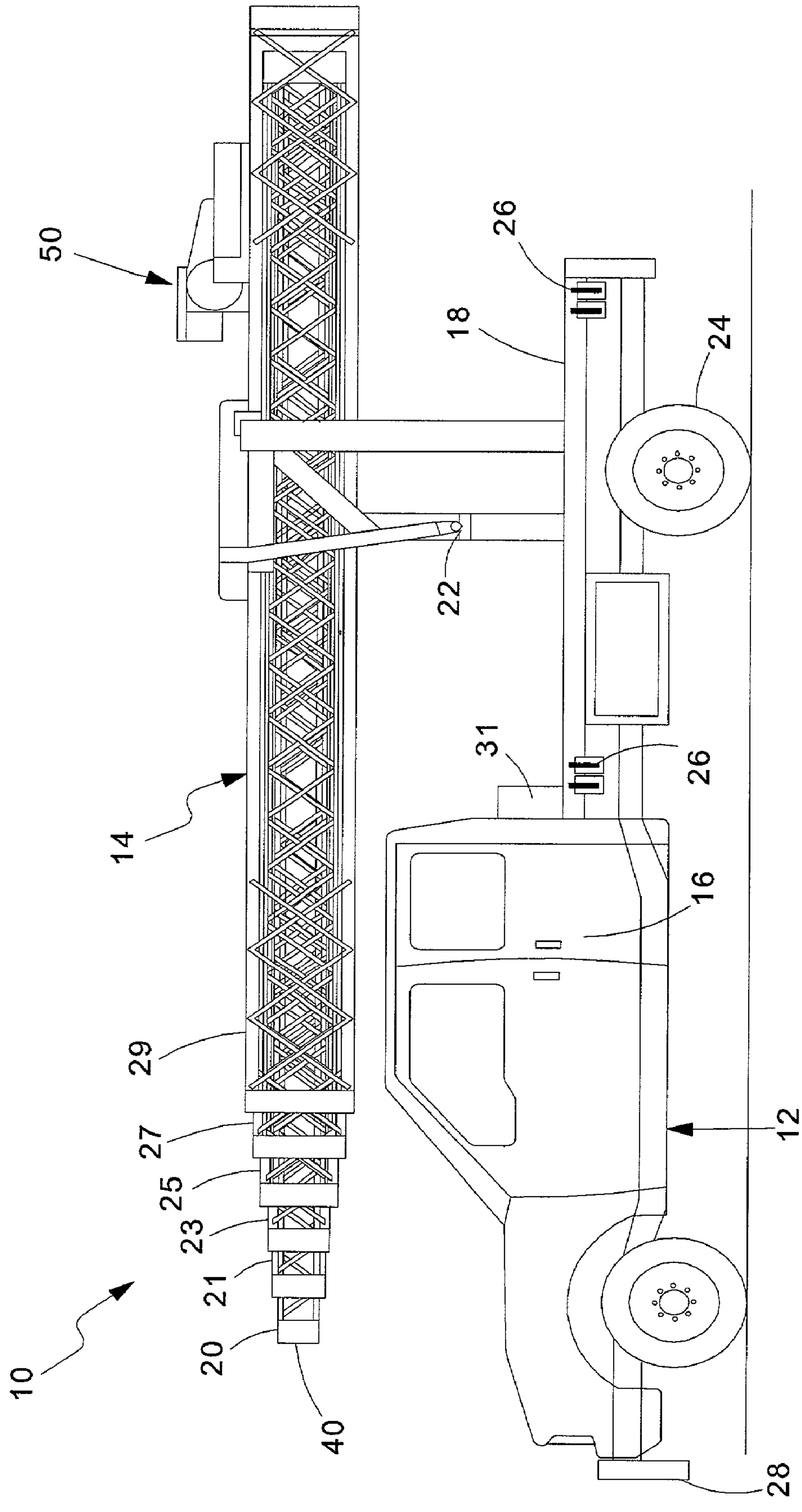
FIG. 1 is a side view of one embodiment of a mobile cellular telephone tower according to the present invention.
Figure 2:
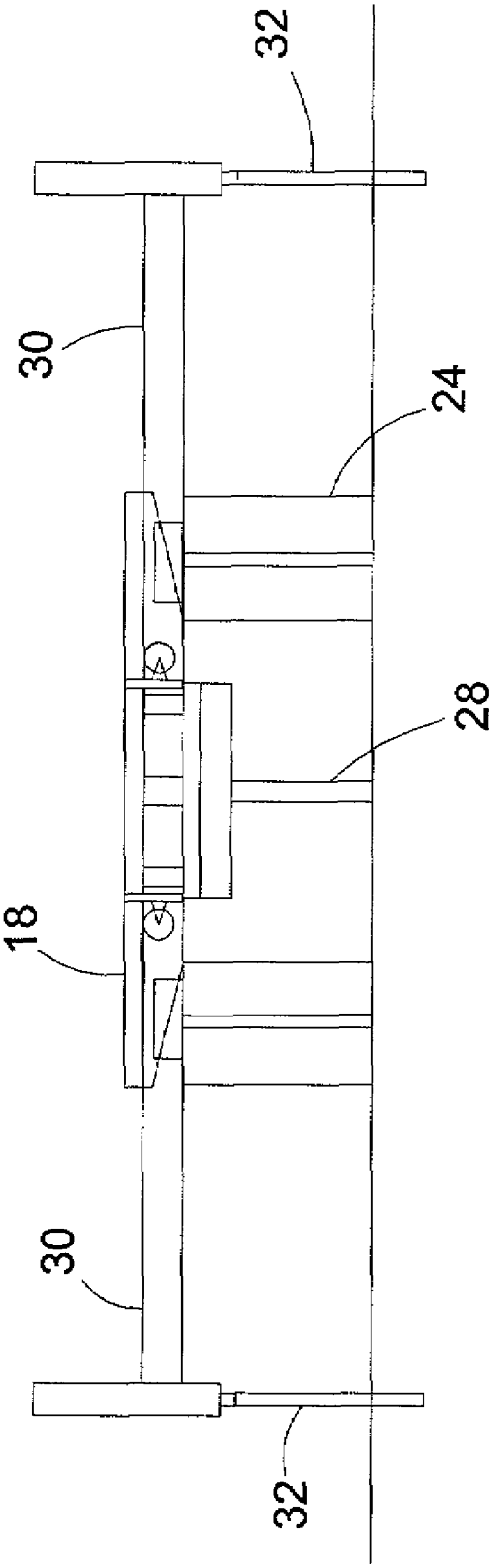
FIG. 2 is a rear view of a platform of the mobile cellular telephone tower with a series of outriggers in deployed positions.

FIGS. 1 and 2 show a mobile cellular telephone tower 10 comprising a self-propelled base 12 and a tower 14 connected to the base. In a preferred embodiment, the self-propelled base 12 is a four-wheel drive or all-wheel drive truck having an extended cab 16 for storing operating equipment and a rear platform 18.

The tower 14 includes a plurality of telescoping, extendable segments 20, 21, 23, 25, 27 and a base segment 29 which, when nested, are movable to a stored position generally horizontal and parallel with the platform 18, as shown in FIG. 1. An arm 22, which may be powered by a hydraulic or electric motor 31, is provided to pivot the tower 14 from the stored position to an operating position generally vertical and perpendicular to the platform 18. To best support the erect tower, the pivot point is advantageously selected to be close to or directly over the rear double wheels 24 of the base 12.

It is preferable that the platform 18 be as level as possible before the tower 14 is erected. To this end, the self-propelled base 12 is provided with a plurality of stabilizing outriggers 26. The outriggers 26 are positioned around the base of the tower 14. In the embodiment shown, two outriggers 26 are placed on each side of the base 12, with one outrigger of each lateral pair positioned in front of the rear wheels 24, and one outrigger of each lateral pair positioned behind the wheels 24. It is also advantageous to provide one or more outriggers 28 proximate the forwardmost end of the base 12. Because of their distance from the pivot point, the outriggers 28 allow additional control to ensure that the platform 18 is level.

All of the outriggers are preferably welded or otherwise attached to the frame or subframe of the self-propelled base 12. The front outriggers 28 may be welded to the front bumper of the vehicle if the bumper is capable of bearing the loads. As shown in FIG. 2, all of the outriggers include a telescoping horizontal member 30 and a telescoping vertical member 32. The horizontal members 30 and the vertical members 32 may be hydraulically, electrically or manually extended and retracted.

After the self-propelled base 12 is driven to the desired test location, a power takeoff provides most necessary power. A six kilovolt diesel generator carried with the base is started to provide power to the electronics, as well as back up power for other functions. The base 12 is leveled with the outriggers, and cellular telephone network testing equipment such as a pod 40 containing an antenna and a continuous wave transmitter with an unmodulated signal is attached to the distal end of the tower 14. The motor 31 then pivots the tower to the vertical position, so that the generally triangular in cross-section segments of the tower can be extended.

Figure 3:
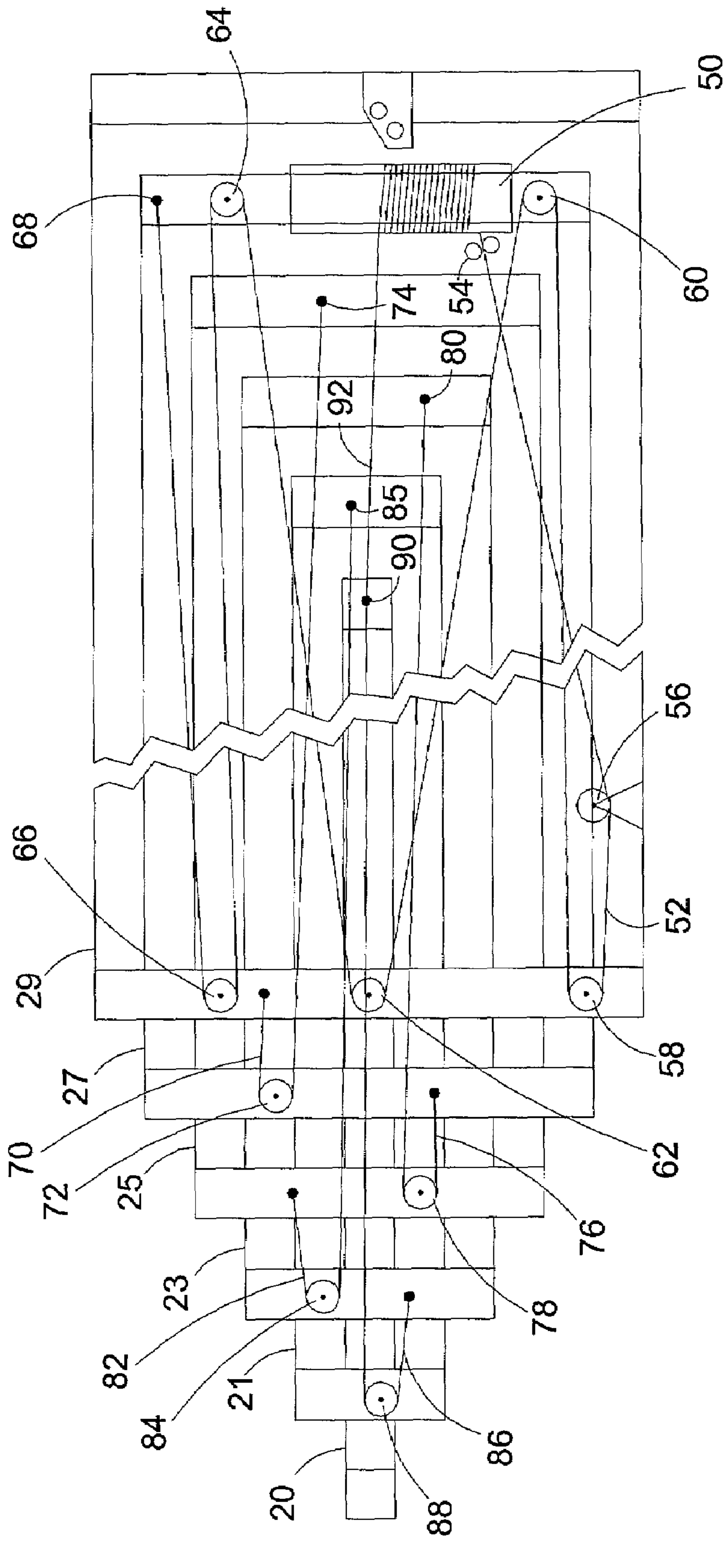
FIG. 3 is a schematic view of a winch mechanism for use with the mobile cellular telephone tower.

As shown in FIG. 3, a winch 50 having cables connected to each of the segments is energized to extend all of the segments simultaneously. The winch is situated on the outside of the outermost tower segment 29 above a lower end cap thereof. A first or main cable 52 winds off the winch 50 through a guide mechanism 54, around a pulley 56 situated on the side of tower segment 29, over a pulley 58 situated on an upper end cap of the segment 29, down and around a pulley 60 on a lower end cap of the first extendable segment 27, back up and around a pulley 62 on the upper end cap of the segment 29, back down and around a pulley 64 on the lower end cap of the segment 27, up and around a pulley 66 on the upper end cap of the segment 29, and finally down to an anchor point 68 on the lower end cap of the segment 27.

A series of fixed-length cables interconnect the tower segments. One of these cables 70 is anchored to the upper end cap of the segment 29, extends around a pulley 72 on the upper end cap of the segment 27, and terminates at an anchor point 74 on the lower end cap of the segment 25. A second fixed-length cable 76 is anchored to the upper end cap of the segment 27, extends around a pulley 78 on the upper end cap of the segment 25, and terminates at an anchor point 80 on the lower end cap of the segment 23. A third fixed-length cable 82 is anchored to the upper end cap of the segment 25, extends around a pulley 84 on the upper end cap of the segment 23, and terminates at an anchor point 85 on the lower end cap of the segment 21. A fourth fixed-length cable 86 is anchored to the upper end cap of the segment 23, extends around a pulley 88 on the upper end cap of the segment 21, and terminates at an anchor point 90 on the lower end cap of the segment 20. Redundant cables may be provided for some or all of these cables in cases, for instance, where it is necessary to balance the forces developed among the tower segments.

The tower segments are extended by powering the winch 50 to take up the deployed part or slack of the cable 52, and thereby draw the lower part of the tower segment 27 toward the upper part of the segment 29. As is apparent, the fixed-length cables operate to extend the nested tower segments such that the narrowest, innermost segment 20 reaches the greatest extension, and so on in turn for the increasingly wider segments 21, 23, 25 and 27. Thus, the top of the segment 27 pulls the bottom of the segment 25 by means of the cable 70. The top of the segment 25 similarly pulls the bottom of the segment 23 by means of the cable 76, the top of the segment 23 pulls the bottom of the segment 21 via the cable 82, and the top of the segment 21 pulls the bottom of the segment 20 via the cable 86. The base segment 29 is fixed relative to the platform, and does not move when the winch 50 is powered. In a preferred embodiment, each of the six segments has a height of about twenty feet so that the tower reaches a total erected height of about one hundred and twenty feet. The temporary cellular telephone site can then remain in operation for as long as necessary.

When the time comes to deactivate the site, the process described above is reversed. The winch 50 is again energized, and winds in reverse to positively pull down the bottom of the segment 20 via a cable 92. The cable 92 can either be a section of a continuous main cable, or the cable 92 and the main cable 52 can be separately anchored to the winch 50. As the segment 20 is retracted, the other segments are also positively retracted, instead of merely being allowed to collapse under their own weight. This is desirable in many situations, such as in high winds or when a substantial buildup of ice has occurred on the tower segments. Positive pulldown helps eliminate binding of the tower segments that often occurs under such conditions. A positive pulldown mechanism that is suitable for the present application is model MDP-750, which may be used in conjunction with tower segments, limiters and other accessories all available from U.S. Tower of Visalis, Calif.

The mobile cellular telephone tower of the present invention thus allows very fast access to testing locations that were previously inaccessible. The present invention is also operable under conditions that were not previously suitable, and furthermore allows a quicker turnaround time for the testing of new sites.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A mobile cellular telephone tower comprising:
a self-propelled base;
a tower connected to the base, the tower including a base segment and at least a first extendable segment operatively connected to a second extendable segment;
a winch connected to the base;
a first cable connected between the base segment and the first extendable segment to extend the first extendable segment;
a second cable connected between the winch and the second extendable segment to retract the second extendable segment; and
cellular telephone network testing equipment mounted on the tower;
the winch being connected to the first cable.

2. The mobile cellular telephone tower of claim 1 wherein the first cable is connected to the second cable.

3. The mobile cellular telephone tower of claim 1 wherein the first extendable segment is nestable within the base segment.

4. The mobile cellular telephone tower of claim 1 wherein the second extendable segment is nestable within the first extendable segment.

5. The mobile cellular telephone tower of claim 1 wherein the tower is movable between a stowed position and an operating position.

6. The mobile cellular telephone tower of claim 5 further comprising a hydraulic motor for moving the tower between the stowed position and the operating position.

7. The mobile cellular telephone tower of claim 5 wherein the tower in the stowed position is oriented generally horizontally.

8. The mobile cellular telephone tower of claim 5 wherein the tower in the operating position is oriented generally vertically.

9. The mobile cellular telephone tower of claim 1 further comprising at least one outrigger connected to the self-propelled base.

10. The mobile cellular telephone tower of claim 9 wherein the at least one outrigger is hydraulically actuated.

11. The mobile cellular telephone tower of claim 1 further comprising a generator mounted on the self-propelled base.

12. A mobile cellular telephone tower comprising:

a self-propelled base;

a tower connected to the base, the tower including a base segment and at least a first extendable segment operatively connected to a second extendable segment;

a first cable connected between the base segment and the first extendable segment;

an electric winch connected to the first cable to extend the first extendable segment, and connected to a second cable to retract the second extendable segment; and cellular telephone network testing equipment mounted on the tower.

13. The mobile cellular telephone tower of claim 12 wherein the winch is connected to the base segment.

14. The mobile cellular telephone tower of claim 12 wherein the first cable is connected to the second cable.

15. The mobile cellular telephone tower of claim 12 wherein the first extendable segment is nestable within the base segment, and the second extendable segment is nestable within the first extendable segment.

16. The mobile cellular telephone tower of claim 12 wherein the tower is movable between a generally horizontal stowed position and a generally vertical operating position.

17. The mobile cellular telephone tower of claim 16 further comprising a hydraulic motor for moving the tower between the stowed position and the operating position.

18. The mobile cellular telephone tower of claim 12 further comprising at least one outrigger connected to the self-propelled base.

19. A mobile cellular telephone tower comprising:

a self-propelled base;

a tower connected to the base, the tower including nestable base, first, and second extendable segments operatively connected to each other;

a first cable connected between the base segment and the first extendable segment;

an electric winch mounted on the base segment, the winch being connected to the first cable to extend the first extendable segment relative to the base, and being connected to a second cable to retract the second extendable segment relative to the base segment;

cellular telephone network testing equipment mounted on the tower; and a motor for moving the tower between a generally horizontal stowed position and a generally vertical operating position.

* * * * *